3,743,660
17-SULFO-ACETATES OF ESTRADIOL
Poul Borrevang, Rodovre, and Erling Guddal, Skovlunde, Denmark, assignors to Novo Terapeutisk Laboratorium A/S, Copenhagen N, Denmark
No Drawing. Filed July 27, 1971, Ser. No. 166,609
Claims priority, application Great Britain, Aug. 3, 1970, 37,397/70
Int. Cl. C07c *169/08*
U.S. Cl. 260—397.5      8 Claims

ABSTRACT OF THE DISCLOSURE

Novel and pharmaceutically active steroid compounds of the estrane series having the general Formula I

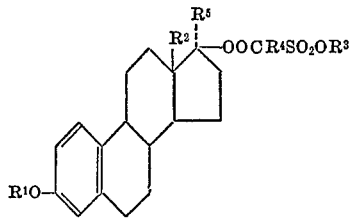

in which $R^1$ is selected from the group consisting of hydrogen; alkyl; cycloalkyl; and heterocycloalkyl, $R^2$ is a lower alkyl group, $R^3$ is selected from the group consisting of hydrogen; alkyl; aryloxyalkyl; and an alkali metal or an alkaline earth metal atom, $R^4$ is alkylene such as methylene, ethylene and trimethylene and $R^5$ is selected from the group consisting of hydrogen and ethinyl, and amine salts of the above compounds of the Formula I in which $R^3$ is hydrogen; and methods for their preparation as well as pharmaceutical compositions comprising the present steroid compounds as an active ingredient.

---

The present invention relates to novel and therapeutically active steroid compounds and methods for their preparation as well as certain novel steroid compounds which may be used as intermediates for preparing the first mentioned compounds. The invention also comprises therapeutical preparations comprising the present steroid compounds as the active ingredients.

Thus, the invention relates to novel steroid compounds of the estrane series containing an aromatic ring A, particularly novel compounds having the general Formula I

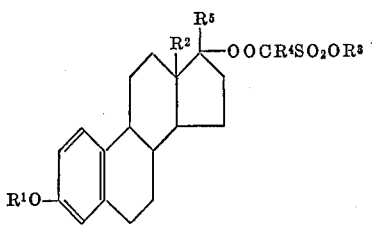

in which $R^1$ may be hydrogen, alkyl, cycloalkyl or heterocycloalkyl, $R^2$ is a lower alkyl group, $R^3$ is alkyl, aryloxyalkyl, hydrogen, an alkali metal or an alkaline earth metal atom, $R^4$ is alkylene such as methylene, ethylene or trimethylene, $R^5$ is hydrogen or ethinyl, as well as amine salts of the free acids, i.e. amine salts of the above compounds in which $R^3$ stands for a hydrogen atom.

It has been found that compounds of the above general formula, e.g. compounds having $R^1$ equal to hydrogen or cyclopentyl, $R^2$ to $CH_3$, $R^3$ to Na, $R^4$ to $CH_2$, $R^5$ to hydrogen are in possession of an oral post-coital anti-fertility effect of the same order as estradiol, but having at the same time a significantly lower estrogenic (uterotrophic) effect (approximately $\frac{1}{50}$ of the estrogenic activity of estradiol). In case $R^5$ is equal to ethinyl the oral post-coital anti-fertility activity is of the order of 0.5 of that of ethinyl estradiol but having a uterotrophic effect of $\frac{1}{100}$ of that of ethinyl estradiol.

In regard to the estrogenic effect it has further been found that some of the compounds show a differentiation of the uterotrophic and the vaginotrophic effects. When $R^5$ means hydrogen and $R^3$ means Na or phenoxyethyl the compounds possess an oral vaginotrophic effect of 0.5–1.5 of that of estradiol and an uterotrophic effect of $\frac{1}{25}$–$\frac{1}{50}$ of that of estradiol, e.g. the compounds are potent orally active estrogens in the vaginal cornification test in rats with weak effect in rats on the uterine weight. The compounds therefore can be useful drugs for treatment in the menopause.

A particularly preferred compound within the scope of the invention is the sodium salt of estradiol-17-sulfoacetate.

On acount of their above-mentioned favorable biological properties the present novel compounds may be used as the active ingredients of therapeutical preparations for oral administration.

According to the invention the present steroid compounds may be prepared by several methods which are described in the following.

A steroid of the general Formula II

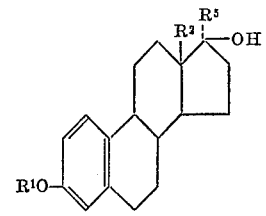

in which $R^1$, $R^2$ and $R^5$ are as defined above, may be treated with a halosulphonylacylhalide to form novel 17-halosulphonylacylate compounds having the general Formula III

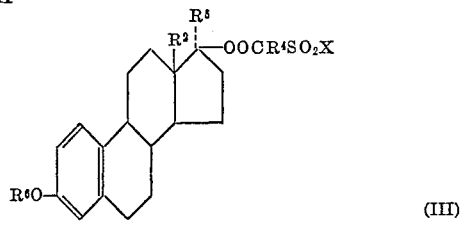

in which $R^2$, $R^4$ and $R^5$ are as defined above, X is a halogen atom, and $R^6$ is $OCR^4SO_2X$, when $R^1$ in the starting compound is hydrogen. In the other instances $R^6$ has the same meaning as $R^1$.

The latter novel compounds may then be treated with an alcohol in some cases preferably methanol, to form compounds of the general Formula IV

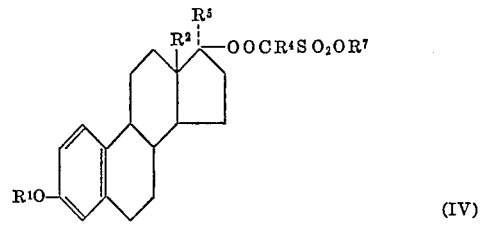

in which $R^1$, $R^2$, $R^4$ and $R^5$ are as defined above, and $R^7$ is an alkyl group corresponding to the alcohol employed. Thus, when $R^6$ is $OCR^4SO_2X$ as mentioned above, the ester is solvolyzed to form the free phenol group in the above treatment.

By subsequent treatment with a reactive alkali metal or alkaline earth metal salt, e.g. dissolved in alcohol, compounds of the Formula I are obtained, in which $R^3$ is an alkali metal or alkaline earth metal atom.

By treating the products thus obtained with an acid, optionally with a strongly acidic ion exchanger, there are obtained compounds of the general Formula I in which $R^3$ is hydrogen. There may thereafter be prepared other salts, e.g. amine salts.

In an alternative method for preparing the present novel steroids of the Formula I in which $R^1$ is hydrogen, the starting material has the general Formula IIb

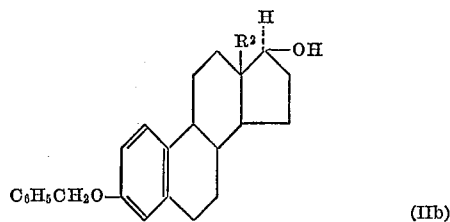

(IIb)

in which $R^2$ is as defined above, i.e. a benzyl ether, which is subjected to treatment with a halosulphonylacylhalide and then with an alcohol to form a compound of the general Formula IVb

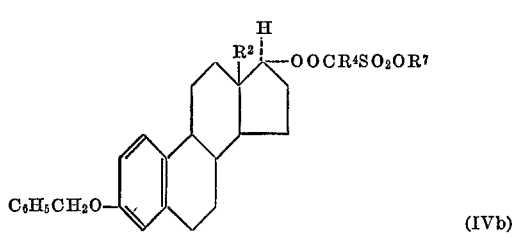

(IVb)

in which $R^2$, $R^4$ and $R^7$ are as defined in the foregoing. The latter compound is then hydrogenated, e.g. using Pd/C in acetic acid, to form a compound of the general Formula IVa

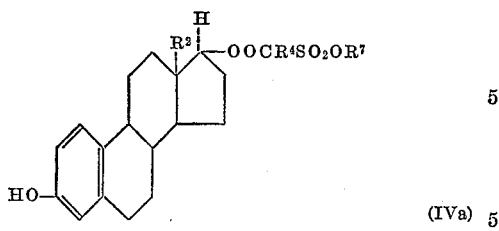

(IVa)

in which $R^2$, $R^4$ and $R^7$ are as defined above, and the said compound is thereafter treated with an alkali metal or alkaline earth metal salt as described above.

By treating the products thus obtained with an acid, optionally with a strongly acidic ion exchanger, there are obtained compounds of the general Formula I in which $R^3$ is hydrogen. There may thereafter be prepared other salts, e.g. amine salts.

Some compounds of the Formula IVa, e.g. compounds having $R^7$ equal to an alkyl group, have been found to possess a marked oral estrogenic effect (both uterotrophic and vaginotrophic), i.e. the differentiation between the estrogenic effects or anti-fertile post-coital effect and uterotrophic effect would appear to be based upon the salt formation or depends on the configuration of the $R^7$ substituent.

In preparing the compounds of the present invention in which $R^1$ is hydrogen, and $R^4$ and $R^5$ are as defined originally in this specification, a starting material of the general Formula IIa

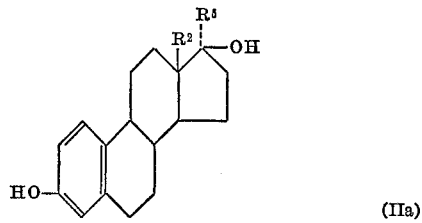

(IIa)

in which $R^2$ and $R^5$ are as defined above, is treated with 2 equivalents of a halogen substituted reactive acid derivative to form a compound of the general Formula V

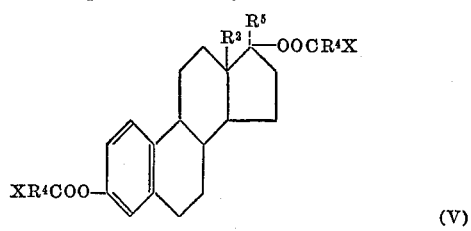

(V)

in which X is a halogen atom and $R^2$, $R^4$ and $R^5$ are as defined above. The latter compound is then treated with a reactive sulphite salt to form a compound of the general Formula Ia

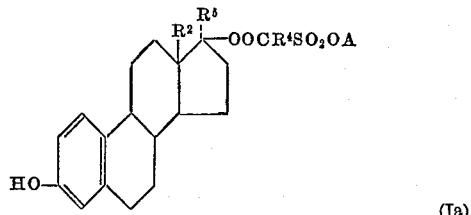

(Ia)

in which A is a cation corresponding to the cation of the reactive sulphite salt used, and $R^4$ and $R^5$ are as defined above. Thus, this treatment proceeds by saponification of the ester compound in the 3-position to form the free phenol group.

By treating the products thus obtained with an acid, optionally with a strongly acidic ion exchanger, there are obtained compounds of the general Formula I in which $R^3$ is hydrogen. There may thereafter be prepared other salts, e.g. amine salts.

The following specific examples serve to further illustrate the preparation of the present steroid compounds.

EXAMPLE 1

Methyl ester of estradiol-17-sulfoacetate-3-methyl ether

To 1.4 g. of estradiol-3-methyl ether 20.0 ml. of dry benzene were added and then with stirring 530 mg. of dry, pulverized $Na_2CO_3$ and a solution of 885 mg. of chlorosulphonylacetylchloride in 5.0 ml. of dry benzene were added. After stirring for one hour the resulting mixture was filtered, and the solution was evaporated in vacuum on a water bath to dryness. To the residue there was added methanol and after stirring for about 20 minutes the compound formed was filtered off. There was obtained 1.0 g. of methyl ester of estradiol-17-sulfoacetate-3-methyl ether, which after recrystallization from methanol showed a melting point of 90–115° C.

Analysis.—Calculated for $C_{22}H_{30}O_6S$ (percent): C, 62.53; H, 7.16; S, 7.59. Found (percent): C, 62.79; H, 7.13; S, 7.38.

EXAMPLE 2

Ethyl ester of estradiol-17-sulfoacetate

Method A.—To 16.2 g. of estradiol there were added 1000 ml. of dry methylene chloride and 24.0 g. of chlorosulphonylacetylchloride. Following stirring at room temperature for 48 hours there were further added 5.8 g. of chlorosulphonylacetylchloride, and stirring was continued for 24 hours. The reaction mixture was filtered, and the filtrate was evaporated to dryness on a water bath in vacuum. 45.0 ml. of dry ethanol were added during cooling in ice-water. After stirring for 3 hours ether was added, and the mixture was extracted thrice with water. The organic phase was dried with $Na_2SO_4$ and evaporated to dryness in vacuum on a water bath. Following further distillation in high vacuum (0.005 mm. Hg) at 70–80° C. there were obtained 13 g. of a residue which was chromatographed on 400 g. of silica gel (moistened with 5 percent $H_2O$). By eluation with methylene chloride and subsequent evaporation there were obtained 4.8 g. of ethyl ester of estradiol-17-sulfoacetate which after stirring with 1-hexanol and filtration showed a melting point of 145–147° C.

Analysis.—Calculated for $C_{22}H_{30}O_6S$ (percent): C=62.53, H=7.16, S=7.59. Found (percent): C=62.75, H=6.80, S=7.31.

Method B.—13.5 g. of estradiol-3-benzyl ether were treated as described in Example 1 using 225 ml. of dry benzene, 4.0 g. of dry pulverized $Na_2CO_3$ and 6.6 g. of chlorosulphonylacetylchloride, the stirring being carried out for 6 hours.

To the residue there was added 99 percent ethanol, thus bringing the residue to crystallisation to obtain 9.2 g. of ethyl ester of estradiol-17-sulfoacetate-3-benzyl ether having a melting point of 92–110° C.

3.8 g. of this ester were dissolved in 190 ml. of glacial acetic acid. 1.1 g. of palladium on charcoal were added, and the resulting mixture was hydrogenated. After about 4 hours the debenzylation had taken place. The reaction mixture was filtered, and the filtrate was evaporated to dryness in vacuum. The residue was dissolved in methylene chloride and was chromatographed on 85 g. of silica gel (moistened with 5 percent of water).

By eluating with methylene chloride, evaporation and recrystallisation from 80 percent ethanol there was obtained 0.5 g. of a compound corresponding to the product obtained by means of method A.

EXAMPLE 3

Sodium salt of estradiol-17-sulfoacetate

Method A.—4.8 g. of the ethyl ester of estradiol-17-sulfoacetate described in Example 2 were dissolved in 70.0 ml. of dry ethanol at reflux, and a boiling solution of 1.7 g. of NaJ in 30.0 ml. of dry ethanol was added. After reflux for 30 minutes the reaction mixture was filtered promptly. After cooling the precipitated crystals were filtered off, and in this manner there were obtained 2.8 g. of sodium salt of estradiol-17-sulfoacetate.

Method B.—13.5 g. of estradiol were dissolved in 100.0 ml. of dry dioxane, and there were added 17.7 g. of chlorosulphonylacetylchloride dissolved in 20.0 ml. of dry dioxane. Following stirring for one and a half hours 50.0 ml. of dry methanol were added, and stirring was continued for a further three hours. After adding ether the reaction mixture was extracted with water. The water phase separated was shaken once with ether. The combined ether phases were extracted twice with water, and the ether solution was dried over $Na_2SO_4$.

After evaporation to dryness in vacuum on a water bath the residue was dissolved in 215.0 ml. of 1-hexanol, and a solution of 5.3 g. of NaJ in 175.0 ml. of 1-hexanol was added. The sodium salt very quickly began to precipitate. After stirring for 30 minutes the salt was filtered off, and in this manner 9.5 g. of sodium salt were obtained.

Method C.—10.0 g. of estradiol and 10.8 g. of chloroacetylchloride were dissolved in 60.0 ml. of dry dioxane under an atmosphere of nitrogen. A solution of 14.0 ml. of pyridine in 15.0 ml. of dioxane was added dropwise during 4 hours at room temperature. Towards the end of the reaction the mixture became permanently pale yellow. The course of the reaction was followed by means of thin layer chromatography on samples (silica gel; acetone:benzene=15:85) and the reaction was stopped as soon as it was complete by means of filtration and pouring into water with stirring.

After filtration and rinsing with cold methanol 14.2 g. of estradiol-3,17-bis-monochloroacetate with a melting point of 119–122° C. were isolated. This product was sufficiently pure for the further synthesis. With the object of analysis the product was recrystallized from a mixture of dioxane and methanol. Colorless crystals having a melting point of 126–127° C. were hereby obtained.

Analysis.—Calculated for $C_{22}H_{26}O_4Cl$ (percent): C=62.11, H=6.17, Cl=16.67. Found (percent): C=61.77, H=6.24, Cl=16.71.

5.15 g. of estradiol-3,17-bis-monochloroacetate were dissolved in 60 ml. of hot diaxone, and 7.7 g. of sodium sulfite dissolved in 300 ml. of boiling water were added all at the same time. The mixture was boiled under reflux until it was clear (about 30 minutes; the course of the reaction may be followed by means of thin layer chromatography). The reaction mixture was extracted thrice with 50.0 ml. of hot-n-butanol, and the combined butanol extracts were washed twice with a saturated sodium chloride solution and twice with water. The butanol extract was evaporated to dryness in vacuum. The residue was suspended in 100.0 ml. of ether, filtered and recrystallized by dissolving in hot, moist butanol to which there were then added 4 parts by volume of dry methanol. The product crystallized by grafting and scratching. In this manner 3.4 g. of sodium salt of estradiol-17-sulfoacetate-sesquihydrate were obtained.

Analysis.—Calculated for $C_{20}H_{25}O_6SNa$, 1½ $H_2O$ (percent): C=54.16, H=6.38, S=7.23, Na=5.19. Found (percent): C=54.59, H=6.35, S=7.15, Na=5.5.

Method D.—1.0 g. of estradiol-3,17-bis-monochloroacetate were dissolved in 10.0 ml. of dioxane. 7.0 g. of sodium bicarbonate dissolved in 10.0 ml. of water were added, and the mixture was stirred effectively at room temperature for two hours and was then filtered. After recrystallisation from methanol 0.64 g. of estradiol-17-monochloroacetate were obtained, which by reaction with sodium sulfite as described in connection with Method C gave the sodium salt of estradiol-17-sulfoacetate. Estradiol-17-monochloroacetate has been mentioned in Japanese patent specification No. 36-21179.

EXAMPLE 4

Sodium salt of estradiol-17-sulfoacetate-3-cyclopentyl ether 8.0 g. of estradiol-3-cyclopentylether (Chem. and Ind., p. 1037 (1961)) were treated as described in Example 1 using 140.0 ml. of dry benzene, 2.5 g. of dry, pulverized $Na_2CO_3$ and 4.15 g. of chlorosulphonylacetylchloride and stirring for 4 hours. To the residue 99 percent ethanol was added, and the crystals formed were filtered off. In this manner 9.7 g. of ethyl ester of estradiol-17-sulfoacetate-3-cyclopentyl ether having a melting point of 69–79° C. were obtained.

The latter ester was dissolved in 135.0 ml. of dry ethanol at reflux, and a boiling solution of 3.6 g. of NaJ in 30.0 ml. of dry ethanol was added. After reflux for 1 hour the mixture was filtered, and the precipitated product was filtered off after cooling. In this manner 4.1 g. of sodium salt of estradiol-17-sulfoacetate-3-cyclopentyl ether were obtained.

Analysis.—Calculated for $C_{25}H_{33}O_6SNa$ (percent): Na=4.75. Found (percent): Na=4.8.

EXAMPLE 5

Ethanolamine salt of estradiol-17-sulfoacetate 0.5 g. of sodium salt of estradiol-17-sulfoacetate were dissolved in moist n-butanol, 2 g. of strongly acidic ion exchanger, e.g. Dowex 50W-8X, were added, and the mixture was stirred until the solution did not give flame reaction for sodium (about 5 minutes). The ion exchanger was then filtered off. To the filtrate 0.5 g. of ethanolamine were added, and the mixture was then evaporated to dryness in vacuum. After dissolving in methanol and precipitation with ether 0.4 g. of ethanolamine salt of estradiol-17-sulfoacetate were obtained in the form of colorless crystals having a melting point of 148–150° C.

*Analysis.*—Calculated for $C_{22}H_{33}O_7SN$ (percent): S=7.04. Found (percent): S=7.39.

EXAMPLE 6

Sodium salt of 17α-ethinylestradiol-17-sulfoacetate 5.0 g. of 17α-ethinylestradiol were dissolved in 175 ml. of dry toluene, and then 25.0 g. of chloroacetic anhydride and 1.0 ml. of a 0.05 molar solution of perchloric acid in dioxane were added, whereafter the mixture was refluxed for 24 hours. (The course of the reaction may be followed by thin layer chromatography.) The solvent was removed in vacuum, the remanence dissolved in methylene chloride and washed thoroughly with sodium bicarbonate and water. The dried solution was filtered through a short column of silica gel, and the solvent removed in vacuum to yield 7.0 g. of crude 17α-ethinylestradiol-3,17-bis-monochloroacetate. Trituration with methanol and recrystallization from ethanol yielded 5.0 g. of colorless crystals, melting at 126–127° C.

*Analysis.*—Calculated for $C_{24}H_{26}O_4Cl_2$ (percent): C=64.14, H=5.84. Found (percent): C=64.54, H=6.08.

5.0 g. of 17α-ethinylestradiol-3,17-bis-monochloroacetate were dissolved in 80.0 ml. of isopropanol, and heated to reflux. 8.2 g. of sodium sulfite dissolved in 140 ml. of water were added, and the mixture was refluxed until a clear solution was obtained (about 30 minutes; the course of the reaction may be followed by thin layer chromatography). Most of the isopropanol was removed in vacuum and the aqueous phase was extracted with hot butanol. The organic extract was washed with water, and the solvent removed in vacuum. Trituration with ether removed some unpolar compounds, yielding 3.35 g. of crude sodium salt of 17α-ethinyl-estradiol-17-sulfoacetate. The compound was obtained as a monohydrate by crystallization from methanol.

*Analysis.*—Calculated for $C_{22}H_{25}O_6SNa:H_2O$ (percent): C=57.62, H=5.94, S=6.99, Na=5.01. Found (percent): C=57.37, H=6.42, S=6.62, Na= 4.6.

EXAMPLE 7

Sodium salt of 3-methoxy-17α-ethinylestradiol-17-sulfoacetate

This compound was prepared as described in Example 6, starting from 3-methoxy-17-ethinylestradiol. The intermediate 3-methoxy-17α - ethinylestradiol-17-chloroacetate was obtained as colorless crystals, melting at 124–125° C.

*Analysis.*—Calculated for $C_{23}H_{27}O_3Cl$ (percent): C=71.40, H=7.05. Found (percent): C=71.49, H=7.27.

The sodium salt of 3-methoxy-17α-ethinylestradiol-17-sulfoacetate was obtained as a sesquihydrate from methanol.

*Analysis.*—Calculated for $C_{23}H_{27}O_6SNa; 1.5H_2O$ (percent): C=57.36, H=6.29, S=6.65, Na=4.78. Found (percent): C=57.09, H=6.39, S=6.65, Na=4.7.

EXAMPLE 8

Sodium salt of estradiol-17β-(3-sulfopropionate)

1.0 g. of estradiol was dissolved in dry acetone, and then 2 ml. of 3-chloropropionylchloride were added, followed by 8 drops of pyridine. The course of the reaction was followed as described in Example 3, Method C, and the reaction was stopped by pouring the reaction mixture into ice water, and then the crystalline precipitate was isolated by filtration.

This product was dissolved in 5.0 ml. of acetone and added dropwise to a well stirred solution of freshly prepared saturated solution of sodium bicarbonate in water and stirred at room temperature for 2 hours. Thereby a partial saponification of the crude estradiol-3,17-bis-(3-chloropropionate) proceeded smoothly and in good yield, producing 1.0 g. of estradiol-17β-(3-chloropropionate) as colorless crystals, which after recrystallization from acetone-water melted at 140–142° C.

*Analysis.*—Calculated for $C_{21}H_{27}O_3Cl$; $0.25H_2O$ (percent): C=68.64, H=7.55, Cl=9.65. Found (percent): C=68.69, H=7.47, Cl=9.83.

1.0 g. of estradiol-17β-(3-chloropropionate) was dissolved in hot dioxane, and added to a solution of 1.5 g. of sodium sulfite in hot water. The mixture was heated with slow distillation of solvent until a clear solution was formed and vigorous foaming started. The hot solution was extracted three times with hot butanol, the organic extract evaporated to dryness in vacuum, the remaining crystals triturated with ether and recrystallized from methanol-ether to yield 0.75 g. of sodium salt of estradiol-17β-(3-sulfopropionate) as a crystalline hydrate.

*Analysis.*—Calculated for $C_{21}H_{27}O_6SNa; 2.5H_2O$ (percent): C=53.04, H=6.79, S=6.74. Found (percent): C=52.65, H=6.44, S=6.34.

EXAMPLE 9

Sodium salt of estradiol-17β-(4-sulfobutyrate)

This compound was prepared as described in Example 8, starting from estradiol and 4-chloro-butyrylchloride. The intermediate 3,17-bis-(4-chlorobutyrate) was not isolated but reacted directly with sodium sulfite. The sodium salt of estradiol-17β-(4-sulfobutyrate) was obtained as colorless crystals, which according to the elemental analyses contained 2.5 moles of water of crystallization.

*Analysis.*—Calculated for $C_{22}H_{29}O_6SNa; 2.5\ H_2O$ (percent): C=53.96, H=7.01, S=6.55, Na=4.70. Found (percent): C=54.27, H=7.17, S=6.84, Na=4.8.

EXAMPLE 10

2-phenoxyethyl ester of estradiol-17-sulfoacetate-3-cyclopentyl ether 1.7 g. estradiol-3-cyclopentyl ether were treated as described in Example 1 using 30.0 ml. of dry benzene, 530 mg. of dry pulverized $Na_2CO_3$ and 885 mg. of chlorosulfonylacetylchloride and stirring for 3 hours. The residue was dissolved by heating in 6.0 ml. of 2-phenoxyethanol. The solution was placed in an ice bath and dry ammonia was introduced for 15 minutes, thereafter water was added while stirring. The water was decanted and a fresh portion of water was added. After the water was decanted ethanol was added to the oil with stirring. After standing the night over the crystals formed were filtered off and in this manner there was obtained 0.6 g. of the 2-phenoxyethyl ester of estradiol-17-sulfoacetate-3-cyclopentyl ether. After recrystallization from ethanol the compound showed a melting point of 120–122° C.

*Analysis.*—Calculated for $C_{33}H_{42}O_7S$ (percent): C=68.01, H=7.21, S=5.50. Found (percent): C=68.30, H=7.25, S=5.48.

What we claim is:

1. A steroid compound of the estrane series having the general Formula I

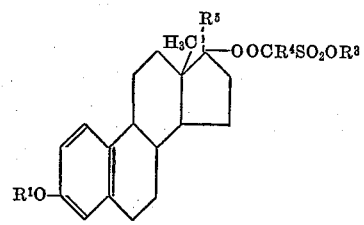

(I)

in which $R^1$ is hydrogen, alkyl, or cycloalkyl;
$R^3$ is hydrogen, alkyl, aryloxyalkyl, or an alkali metal atom,
$R^4$ is alkylene such as methylene, ethylene and trimethylene, and
$R^5$ is hydrogen or ethinyl, and amine salts of the above compounds of the Formula I in which $R_3$ is hydrogen.

2. A steroid compound according to claim 1, in which $R^3$ is Na or phenoxyethyl and $R^5$ is hydrogen.

3. A steroid compound according to claim 1, in which $R^1$ is hydrogen, $R^3$ is sodium, $R^4$ is methylene, and $R^5$ is hydrogen.

4. A steroid compound according to claim 1, in which $R^1$ is hydrogen or methyl, $R^3$ is sodium, $R^4$ is methylene, and $R^5$ is ethinyl.

5. The sodium salt of a compound according to claim 1.

6. The sodium salt of estradiol-17-sulfoacetate.

7. The sodium salt of 17-α-ethinylestradiol-17-sulfoacetate.

8. The sodium salt of 3-methoxy - 17 - α - ethinylestradiol-17-sulfoacetate.

No references cited.

ELBERT L. ROBERTS, Primary Examiner

U.S. Cl. X.R.

424—238

UNITED STATES PATENT OFFICE
CERTIFICATE OF CORRECTION

Patent No. 3,743,660                    Dated July 3, 1973

Inventor(s) Poul Borrevang and Erling Guddal

It is certified that error appears in the above-identified patent and that said Letters Patent are hereby corrected as shown below:

In Column 1, Formula I appearing between lines 50-60, should be changed to show a broken line linkage to $R^5$ In Column 6, line 16, change "diaxone" to --dioxane--

In Column 9, line 6, change "$R_3$" to --$R^3$--

Signed and sealed this 7th day of May 1974.

(SEAL)
Attest:

EDWARD M. FLETCHER, JR.
Attesting Officer

C. MARSHALL DANN
Commissioner of Patents